United States Patent
Barsky

(10) Patent No.: US 11,580,656 B1
(45) Date of Patent: Feb. 14, 2023

(54) SYSTEMS AND METHODS FOR DETECTING AND CORRECTING DATA DENSITY DURING POINT CLOUD GENERATION

(71) Applicant: Illuscio, Inc., Culver City, CA (US)

(72) Inventor: Kevan Spencer Barsky, Los Angeles, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 17/936,646

(22) Filed: Sep. 29, 2022

Related U.S. Application Data

(63) Continuation of application No. 17/825,351, filed on May 26, 2022, now Pat. No. 11,468,583.

(51) Int. Cl.
*G06K 9/00* (2022.01)
*G06T 7/521* (2017.01)
*G06T 7/90* (2017.01)

(52) U.S. Cl.
CPC ............... *G06T 7/521* (2017.01); *G06T 7/90* (2017.01); *G06T 2207/10028* (2013.01)

(58) Field of Classification Search
CPC . G06T 7/521; G06T 7/90; G06T 2207/10028; G06T 7/70; G06T 7/80; G06T 7/40; G06T 5/70; G06T 5/529; G06T 7/60; G06T 2207/10032; G06T 2207/10036; G06T 2207/10041; G06T 2207/10044; G06V 2201/12
See application file for complete search history.

(56) References Cited

U.S. PATENT DOCUMENTS

| | | | | |
|---|---|---|---|---|
| 4,873,651 | A * | 10/1989 | Raviv | G06T 1/0014 356/601 |
| 5,930,383 | A * | 7/1999 | Netzer | G01B 11/24 382/285 |
| 11,074,703 | B1 | 7/2021 | Monaghan et al. | |
| 2008/0072078 | A1 | 3/2008 | Ito | |
| 2016/0088286 | A1 | 3/2016 | Forsythe et al. | |
| 2018/0095450 | A1* | 4/2018 | Lappas | B33Y 10/00 |
| 2019/0180502 | A1 | 6/2019 | England et al. | |

(Continued)

OTHER PUBLICATIONS

Jin, Xin & Wu, Zhaoxing & Song, Chenggen & Zhang, Chunwei & Li, Xiaodong. (2016). 3D Point Cloud Encryption Through Chaotic Mapping. 9916.119-129.10.1007/978-3-319-48890-5_12. (Year: 2016).

(Continued)

*Primary Examiner* — Duy M Dang
(74) *Attorney, Agent, or Firm* — Ansari Katiraei LLP; Arman Katiraei; Sadiq Ansari

(57) ABSTRACT

A point cloud capture system is provided to detect and correct data density during point cloud generation. The system obtains data points that are distributed within a space and that collectively represent one or more surfaces of an object, scene, or environment. The system computes the different densities with which the data points are distributed in different regions of the space, and presents an interface with a first representation for a first region of the space in which a first subset of the data points are distributed with a first density, and a second representation for a second region of the space in which a second subset of the data points are distributed with a second density.

18 Claims, 9 Drawing Sheets

(56) References Cited

U.S. PATENT DOCUMENTS

| | | | |
|---|---|---|---|
| 2019/0197739 A1 | 6/2019 | Sinharoy et al. |
| 2019/0236850 A1 | 8/2019 | Li |
| 2019/0333070 A1 | 10/2019 | Lochan Dass et al. |
| 2020/0111237 A1 | 4/2020 | Tourapis et al. |
| 2020/0205723 A1 | 7/2020 | Massey et al. |
| 2020/0219288 A1 | 7/2020 | Joshi et al. |
| 2020/0221125 A1 | 7/2020 | Budagavi et al. |
| 2020/0374498 A1 | 11/2020 | Sodhi et al. |

OTHER PUBLICATIONS

A. Jolfaei, X. Wu and V. Muthukkumarasamy, "A 3D Object Encryption Scheme Which Maintains Dimensional and Spatial Stability," in IEEE Transactions on Information Forensics and Security, vol. 10, No. 2, pp. 409-422, Feb. 2015, doi: 10.1109/TIFS. 2014.2378146. (Year: 2015).

Yang, X., & Zhang, H. (2016). Encryption of 3D point cloud object with deformed fringe. Advances in Optical Technologies, 2016 doi:http://dx.doi.org/10.1155/2016/4601462 (Year: 2016).

\* cited by examiner

SYSTEMS AND METHODS FOR DETECTING AND CORRECTING DATA DENSITY DURING POINT CLOUD GENERATION

CLAIM OF BENEFIT TO RELATED APPLICATIONS

This application is a continuation of U.S. nonprovisional application Ser. No. 17/825,351 entitled "Systems and Methods for Detecting and Correcting Data Density During Point Cloud Generation", filed May 26, 2022 and issued as U.S. Pat. No. 11,468,583. The contents of application Ser. No. 17/825,351 are hereby incorporated by reference.

BACKGROUND

A point cloud may represent a three-dimensional ("3D") object, scene, or environment with data points that are distributed and/or positioned within a 3D space. Imaging devices, including Light Detection and Ranging ("LiDAR") scanners, structured light cameras, and/or other sensors, may be used to scan the surfaces of the 3D object or the surfaces within the scene or environment, and to generate the individual data points of the point cloud from the scans.

Different surfaces may be different distances from the imaging device or at different angles or orientations relative to the imaging device. Consequently, some surfaces may have greater exposure to the imaging device, and may be represented with a higher density of data points in the point cloud. Other surfaces may have lesser exposure to the imaging device, and may be represented with a lower density of data points in the point cloud. As a result, the generated point cloud may represent regions of the same object, scene, or environment with different resolutions and with different levels-of-detail or quality, thereby producing an inaccurate representation of the captured object, scene, or environment.

DETAILED DESCRIPTION OF PREFERRED EMBODIMENTS

The following detailed description refers to the accompanying drawings. The same reference numbers in different drawings may identify the same or similar elements.

Provided are systems and methods for detecting and correcting data density during point cloud generation. The systems and methods may include analyzing data that is generated from imaging, scanning, and/or otherwise capturing a three-dimensional ("3D") object, scene, or environment with one or more imaging devices, determining the density of the data that is generated for different regions of the 3D object, scene, or environment, and/or controlling a subsequent data capture for the same 3D object, scene, or environment. By determining the data density and by controlling the subsequent data captures, the systems and methods may produce a point cloud with a consistent or minimum density throughout, and/or a point cloud that generates an image with an accurate or minimum level-of-detail or quality throughout.

In some embodiments, controlling the subsequent data capture may include generating a heat map or interface based on the density of the data that is generated from different regions of the 3D object, scene, or environment. The interface may overlay different colors, statistical information, and/or visual guides to notify an operator as to the capture quality at the different regions and/or whether the generated data satisfies quality or density thresholds that are set of those regions. The interface may be updated in real-time as the imaging devices generate the point cloud data. A user performing a manual scanning of the 3D object, scene, or environment may reference the interface to determine low density regions that need to be rescanned or scanned from a different position in order to obtain a desired data density for the low density regions. In some embodiments, the interface may identify dynamic movements of the imaging device or adjustments to the imaging device settings for rescanning the low density regions to satisfy a minimum or consistent level-of-detail, quality, or density that is specified for the point cloud.

Figure 1:
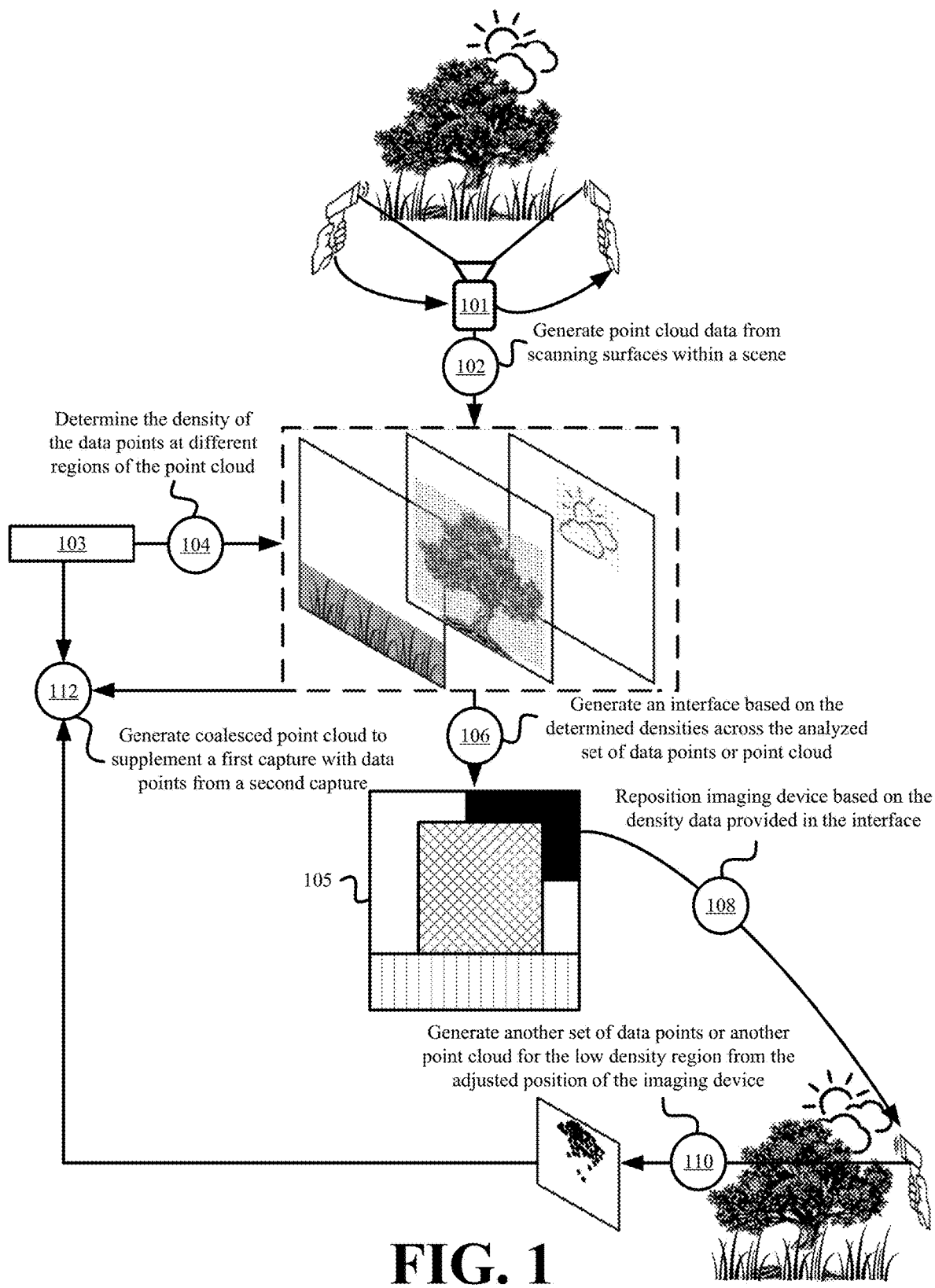
FIG. 1 illustrates an example interface for determining and/or controlling the density of point cloud data points captured for different regions of an object, scene, or environment in accordance with some embodiments presented herein.

FIG. 1 illustrates an example interface for determining and/or controlling the density of point cloud data points captured for different regions of a 3D object, scene, or environment in accordance with some embodiments presented herein. As shown in FIG. 1, imaging device 101 may be used to scan (at 102) different surfaces within a particular scene. Scanning (at 102) the different surfaces may include generating a data point representation of the scanned surfaces. For instance, imaging device 101 may generate a data point in the 3D space of a point cloud to match the position of a scanned point from a surface within the particular scene.

In some embodiments, a user may move imaging device 101 across the particular scene, and imaging device 101 may scan and generate a different set of data points or point clouds at a particular rate for the surfaces of the particular scene that are within the field-of-view of imaging device 101 at the different positions.

Each generated point cloud data point may be defined with a plurality of elements. The plurality of elements may include a first set of positional elements and a second set of non-positional or descriptive elements.

The positional elements may include coordinates within a 3D space. For instance, each point cloud data point may include x-coordinate, y-coordinate, and z-coordinate elements that match or map the position of a different scanned, imaged, and/or captured point from a surface within the particular scene.

The non-positional elements may include information about the detected characteristics of the scanned, imaged, and/or captured point from the surface within the particular scene. The characteristics may correspond to a detected color. The color may be represented using red, green, blue ("RGB"), and/or other values. In some embodiments, the characteristics may provide the chrominance, hardness, translucence, reflectivity, luminance, metallic characteristics, roughness, specular, diffuse, albedo, index of refraction ("IOR"), and/or other properties of the scanned, imaged, and/or captured point.

In some embodiments, the characteristics may be related to properties of the device used to generate each of data points. For instance, the characteristics may include a Tesla strength value to quantify the strength of the magnetic field that was used in detecting and/or imaging the scanned, imaged, and/or captured point from the particular scene represented by a particular point cloud data point. In some embodiments, the non-positional elements may include energy, audio or sound, and/or other characteristics of the device or the object being imaged. Accordingly, the non-positional elements can include any property of an imaged, scanned, and/or captured surface or of the device used to capture the surface at a corresponding data point in 3D space.

Accordingly, a point cloud data point may be stored and/or represented as an array of elements with some combination of x-coordinate, y-coordinate, z-coordinate, red, green, blue, chrominance, hardness, translucence, reflectivity, luminance, metallic characteristics, roughness, specular, diffuse, albedo, IOR, tesla, and/or other values. The generated point cloud may include millions or billions of such data points that correspond to detected points about different surfaces within the particular scene.

The point cloud data generated by imaging device 101 may be provided to controller 103 for evaluation. In some embodiments, controller 103 may analyze the positional data elements of the generated data points. In some embodiments, controller 103 may perform the analysis as each set of data points or point cloud is generated by imaging device 101, and/or may perform the analysis at the rate by which imaging device 101 generates a different set of data points or point cloud corresponding to a different scan, image, or capture of the particular scene.

Analyzing the positional data elements may include determining (at 104) the density of the data points at different regions of the point cloud. For instance, controller 103 may compute the density between adjacent or neighboring data points in order to determine the density of data points in the different regions of the point cloud. In some embodiments, controller 103 may partition the 3D space of the point cloud into different regions or volumes, and may count the number of data points in each region or volume to determine the data point density across the 3D space. The density in each region may correspond to the level-of-detail, resolution, or quality with which the surface or object in that region was imaged by imaging device 101.

Controller 103 may generate (at 106) a heat map, visualization, or interface 105 based on the determined densities across the analyzed set of data points or point cloud. In some embodiments, interface 105 may be presented as on overlay with different colors, text, graphics, and/or other representations for the different determined densities. For instance, controller 103 may combine interface 105 with a real-time view provided by imaging device 101. In this instance, interface 105 may be presented over the image within the viewfinder of imaging device 101 with interface 105 providing a first representation or color (e.g., red) for regions that were captured with a low density of data points or less than a first threshold density of data points, a second representation or color (e.g., yellow) for regions that were captured with an acceptable density of data points or that satisfy the first threshold density of data points, and a third representation or color (e.g., green) for regions that were captured with a high density of data points or that satisfy the first threshold density and a second threshold density representing a high resolution or high detailed scan. In some embodiments, controller 103 may render the data points that are output by imaging device 101 to create an image of the particular scene, and may overlay interface 105 over the rendered image. In some embodiments, controller 103 may provide interface 105 without also providing an image of the particular scene.

In some embodiments, controller 103 may generate interface 105 and/or the overlay visualizations based on user-defined density thresholds or system-specified threshold. For instance, a user may wish to capture the particular scene with a data point density of 0.1 millimeters ("mm"). Accordingly, the user may configure controller 103 with a density threshold of 0.1 mm, and controller 103 may evaluate the distance between neighboring data points based on the configured density threshold. In a first set of regions where the data points are separated by more than 0.1 mm or where the average distance between data points is greater than 0.1 mm, controller 103 may represent the first set of regions in the overlay, visualization, and/or interface 105 with a first color (e.g., red) that connotes a low density or a density that does not satisfy the user-defined threshold. In other regions where the data points are separated by less than 0.1 mm or where the average distance between data points is less than 0.1 mm, controller 103 may represent the second set of regions in the overlay, visualization, and/or interface 105 with a different second color (e.g., green) that connotes a high density or a density that satisfies the user-defined threshold.

Interface 105 provides a user, that controls imaging device 101, with real-time or immediate feedback as to the capture quality of the particular scene and/or the point cloud data that is generated by each activation of imaging device 101. The user may reference interface 105 after each activation or each scan of the particular scene in order to correct for any deficiencies, poorly scanned surfaces, and/or regions of the point cloud with an insufficient density of data points prior to completing the imaging, scanning, or capture of the particular scene.

As shown in FIG. 1, interface 105 may identify that imaging device 101 captures a surface or objects in the upper right region of the particular scene with a low density of data points (e.g., present the upper right region in interface 105 with a red overlay or visualization). Based on this feedback, the user may keep imaging device 101 at its current position to lengthen the exposure of the particular scene and thereby capture the upper right region and/or other regions with more detail. Alternatively, the user may reposition (at 108) imaging device 101 based on the density data provided in interface 105, and may place imaging device 101 closer to the surface or objects in the upper right region or to obtain an obstructed view of the surface, and may rescan the surface or objects from the different position in order to generate (at 110) another set of data points or another point cloud with additional data points for the low density region from the adjusted position of imaging device 101.

Controller 103 may combine the additional output that is generated by imaging device 101 for the upper right region of the particular scene with the output that was previously generated for the particular scene, and may generate (at 112) a coalesced point cloud in which the density of data points in the upper right region is supplemented with data points captured from one or more additional scans of that upper right region.

In some embodiments, controller 103 may use one or more artificial intelligence and/or machine learning ("AI/ML") techniques to differentiate between a surface or scene that is correctly captured with a low density of data points from a surface or scene that is improperly captured with a low density of data points. For instance, a first surface may be far away from imaging device 101 and/or may lack detail such that a low density capture of that surface accurately represents that surface, whereas a second surface may be partially obstructed by another surface resulting in the improper low density capture of the second surface.

In some embodiments, controller 103 may use the one or more AI/ML techniques to guide the user in correcting regions that are captured with a low density of data points. For instance, controller 103 may determine the cause behind a particular region being captured with a low density of data points, and may provide direction by which a user may improve the capture of that particular region. For instance, controller 103 may determine that the surface being capture is partially obscured by another surface which leads to the low density capture. Accordingly, controller 103, via interface 105, may instruct the user on where to reposition imaging device 101 and which imaging device settings to adjust in order to improve the capture of the desired surface based on the positioning of other data points in the point cloud.

In some embodiments, controlling the subsequent data capture may include directly controlling the positioning and/or imaging settings of imaging device 101. For instance, the systems and methods may include mounting imaging device 101 to a robotic element, and using controller 103 to control the robotic element based on the determined data point density at different regions of the 3D object, scene, or environment being captured. Controller 103 may move or reposition imaging device 101 about the 3D object, scene, or environment being captured to ensure that each surface or part is scanned and represented with at least a minimum density of data points.

Controller 103 may also be coupled to imaging device 101 with a wired or wireless link, and may adjust settings of imaging device 101 based on the wired or wireless link. For instance, controller 103 may adjust the zoom of a lens attached to imaging device 101, a structured light pattern, laser pattern, and/or visible or non-visible light intensity that is projected from imaging device 101 and that is used to resolve detail about a surface, and/or other configurable imaging device settings that alter the scanning or image capture of surfaces or objects at different distances or positions relative to imaging device 101. For instance, imaging device 101 may use laser triangulation to resolve detail about the surface, and controller !103 may adjust the wavelength, width, and/or other properties of the laser to resolve different detail at different distances or on different materials.

Figure 2:
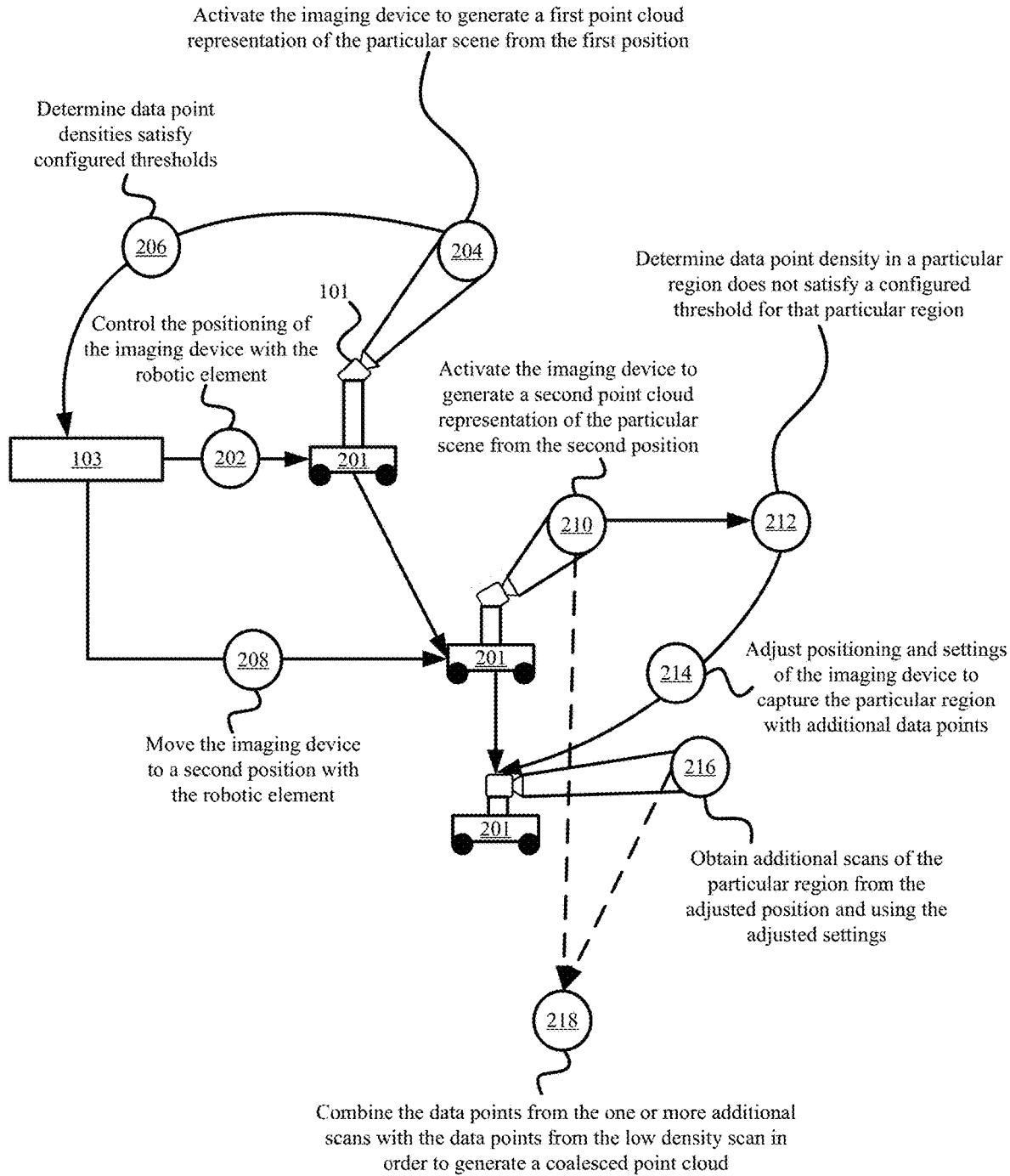
FIG. 2 illustrates an example of directly controlling data capture based on a density evaluation in accordance with some embodiments presented herein.

FIG. 2 illustrates an example of directly controlling the data capture with controller 103 based on the density evaluation performed by controller 103 in accordance with some embodiments presented herein. As shown in FIG. 2, controller 103 may control (at 202) robotic element 201 to position imaging device 101 at a first position for a first capture of a particular scene, and may activate (at 204) imaging device 101 to generate a point cloud representation of the particular scene from the first position.

Controller 103 may receive the output that is generated by imaging device 101. In particular, controller 103 may receive the data points that imaging device 101 generates from imaging, scanning, and/or capturing the particular scene from the first position.

Controller 103 may evaluate the point cloud data in order to determine (at 206) the density of the data points captured for different regions of the scene or environment. Controller 103 may determine that the particular scene is imaged with a sufficient density of data points in all regions, and may control (at 208) robotic element 201 in repositioning imaging device 101 to a second position for capturing a neighboring or remaining part of the scene or environment.

Controller 103 may activate (at 210) imaging device 101, and may evaluate the point cloud data that is generated by imaging device 101 at the second position. Controller 103 may determine (at 212) that the data point density at a particular region of the second capture is less than a density threshold. Rather than advance imaging device 101 to a next position, controller 103 may control robotic element 201 in repositioning (at 214) imaging device 101 to better image, scan, and/or capture the particular region. For instance, robotic element 201 may move imaging device 101 physically closer to the particular region, or may rotate, elevate, and/or otherwise adjust the positioning of imaging device 101 to obtain a different or better view from which the particular region may be imaged, scanned, and/or captured with additional data points. In some embodiments, controller 103 may adjust (at 214) imaging settings of imaging device 101 to focus on, zoom on, and/or otherwise improve the imaging, scanning, or capturing of the particular region.

Controller 103 may activate (at 216) imaging device 101 from the adjusted position and/or with the adjusted settings to obtain one or more additional scans of the particular region. Controller 103 may combine (at 218) the data points from the one or more additional scans with the data points from the low density scan in order to generate a coalesced point cloud. The coalesced point cloud may supplement the data points from the low density scan with additional data points from the one or more additional scans. The coalesced point cloud may therefore represent the particular region with the greater density of data points that results from combining the two or more scans of the particular region from the different positions and/or with the different imaging device settings.

Controller 103 may evaluate the density of the combined data points in the particular region to determine if the density of the combined data points satisfies a density threshold. In response to the density threshold not being met, controller 103 may obtain additional scans of the particular region from other positions or with other imaging settings. In response to the density threshold being met, controller 103 may control robotic element 201 in positioning imaging device 101 to capture a next or different scene or environment.

Figure 3:
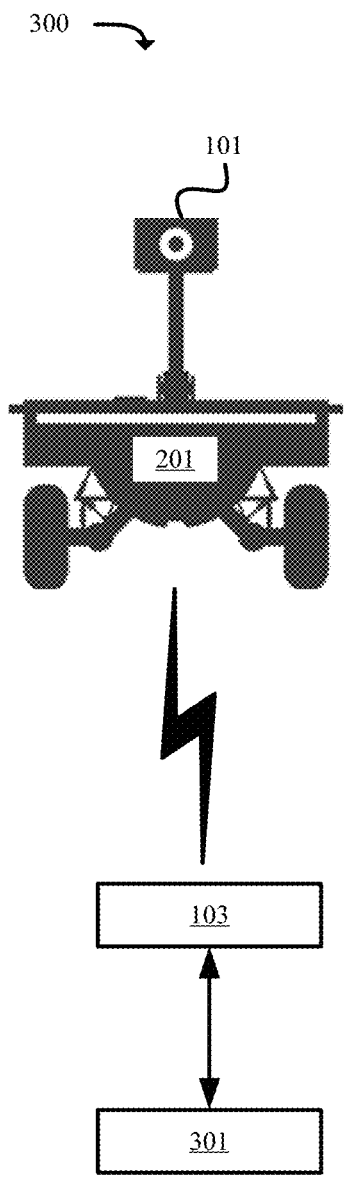
FIG. 3 illustrates an example system architecture for detecting and correcting data density during point cloud generation in accordance with some embodiments presented herein.

FIG. 3 illustrates an example system architecture 300 for detecting and correcting data density during point cloud generation in accordance with some embodiments presented herein. System architecture 300 may include imaging device 101, controller 103, robotic element 201, and postprocessing device 301.

Imaging device 101 may include any one or more sensors and/or devices that generate image data from scanning an object, scene, or environment. In some embodiments, the image data generated by imaging device 101 may include data points distributed in a 3D space. In some other embodiments, the image data generated by imaging device 101 may include pixels with a non-uniform density or distribution.

Imaging device 101 may include one or more of a 3D or depth-sensing camera, Light Detection and Ranging ("LiDAR") sensor, Magnetic Resonance Imaging ("MRP") device, Positron Emission Tomography ("PET") scanning device, Computerized Tomography ("CT") scanning device, time-of-flight device, structured light pattern camera, laser triangulation scanner, and/or other imaging equipment for 3D objects, volumetric objects, or 3D environments. In some embodiments, the point cloud data and/or data points for the imaged object, scene, or environment may be generated from output of two or more devices. For instance, a first imaging device (e.g., a LiDAR sensor) may determine the position for each data point in 3D space, and a second imaging device (e.g., a high-resolution camera) may measure or capture the characteristics or other non-positional information for each data point. One or more photogrammetry techniques may be used to consolidate the data from the first imaging device and the second imaging device, and to populate the positional and non-positional elements of the point cloud data points.

In some embodiments, imaging device 101 may be a handheld or portable device that a user movers to capture an object, scene, or environment from different positions. In some other embodiments, imaging device 101 may be mounted to robotic element 201, and robotic element 201 may be used to adjust the positioning of imaging device 101.

Controller 103 may include a device with a display and one or more processors. Imaging device 101 may be configured to output the generated image data or point cloud data (e.g., the data points generated from imaging an object, scene, or environment) to controller 103.

In some embodiments, controller 103 may be integrated as part of imaging device 101, and may receive the point cloud data that is generated by imaging device 101 by directly accessing the memory and/or storage of imaging device 101. In some embodiments, controller 103 may be a separate device that receives the point cloud data from imaging device 101 via a wired or wireless link.

In some embodiments, controller 103 may evaluate the point cloud data as the data is generated by imaging device 101 in order to provide real-time feedback as to the quality of the scanned objects, scenes, or environments that are converted into point clouds. For instance, as each frame, image, or set of data points for the point cloud is generated, controller 103 may evaluate the data point density in that frame, image, or set of data points to determine if the frame, image, or set of data points satisfies a density threshold. Controller 103 may present the results on the display, and the user may reference the display to determine if certain parts of an object, scene, or environment are captured with an insufficient data point density, and therefore need to be rescanned from the same position, a different position, and/or different imaging device settings.

In some embodiments, controller 103 may evaluate the point cloud data after imaging device 101 completes scanning one or more objects, scenes, or environments. In some such embodiments, controller 103 may evaluate the point cloud data, and may identify the regions that do not satisfy the density thresholds after the imaging or scanning of the objects, scenes, or environments is complete. The deficient regions may be imaged or scanned again, from different positions, or with different imaging device settings.

Controller 103 may present the interface showing visualizations and/or other identifying information about the data point density at different regions of a frame, image, or point cloud on the display. The display may convey the information to a user that manually performs the imaging of the objects, scenes, or environments.

Controller 103 may also be connected to robotic element 201, and may control the positioning of imaging device 101 by controlling movements and positions of robotic element 201. In some embodiments, robotic element 201 may include a motorized rig onto which imaging device 101 may be mounted. The motorized rig may include motors and a wheeled base for moving across a ground surface, and an articulating arm with one or more actuators to elevate, rotate, and/or otherwise adjust the position or orientation of imaging device 101 above the ground surface. In some embodiments, the motorized rig may move across a rail or track. The motorized rig may also include cameras, positional sensors (e.g., Global Positioning System ("GPS") sensors), and/or other components from which the position of imaging device 101 mounted to the motorized rig may be determined.

In some embodiments, robotic element 201 may include an automated or remote-controlled aerial device such as a drone, helicopter, or fixed-wing aircraft. Imaging device 101 may be mounted to the automated or remote-controller aerial device, and the aerial device may be used to position imaging device 101 within 3D space.

Postprocessing device 301 may create a feedback loop with controller 103. In some embodiments, postprocessing device 301 may receive the point cloud data that is generated by imaging device 101, and may coalesce data points that are captured for the same region. Specifically, a first capture of a particular region may include a first set of data points that do not satisfy a density threshold. A second capture of the particular region may include additional data points that are generated from imaging, scanning, and/or capturing the particular region with a second exposure, a different position, and/or different imaging device settings. Postprocessing device 301 may align and combine the data points of the first capture with the data points of the second capture to create a single composite point cloud. For instance, postprocessing device 301 may analyze the data point positional elements from each capture, adjust the positioning based on the relative positioning of imaging device 101 when each capture was taken, and may insert data points from the second capture into the first capture to increase the density of data points in the first capture.

Figure 4:
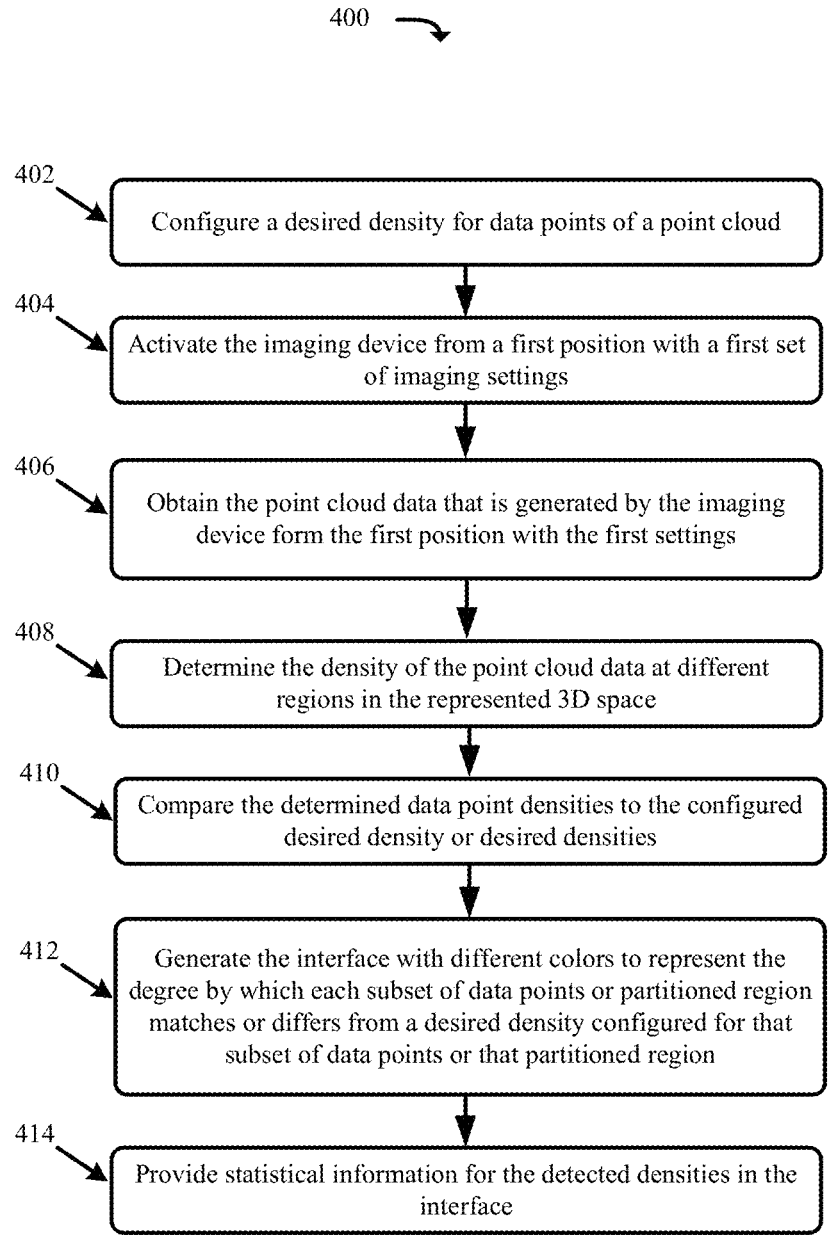
FIG. 4 presents a process for generating an interface for representing the quality of a point cloud capture in accordance with some embodiments presented herein.

FIG. 4 presents a process 400 for generating an interface for representing the quality of a point cloud capture in accordance with some embodiments presented herein. Process 400 may be implemented by controller 103.

Process 400 may include configuring (at 402) a desired density for data points of a point cloud. In some embodiments, a user may specify the desired density, and may input the desired density to controller 103. In some embodiments, controller 103 may derive the desired density based on a file size, level-of-detail, resolution, and/or parameters that are specified for the point cloud that is to be generated.

The desired density may correspond to a desired resolution, quality, and/or level-of-detail for the point cloud representation of the imaged object, scene, or environment. An increase in density corresponds to a greater number of data points being used to represent the same surface or object which may translate to a more detailed or higher resolution capture of that surface or object as more data points may be dedicated to represent each individual detail detected on that surface or object.

The desired density may define the maximum distance or space between neighboring data points of the point cloud. Accordingly, the desired density may be defined in terms of a distance measure, wherein the distance measure may be specified as a value in centimeters, millimeters, or other measures. Alternatively, the desired density may be defined in terms of a number of data points per unit of space.

In some embodiments, multiple different desired densities may be configured (at 402) for different regions of a point cloud. For instance, a greater first desired density may be configured (at 402) for data points representing objects in the foreground (e.g., data points with a z-coordinate position less than a particular value), and a lesser second desired density may be configured (at 402) for data points representing objects in the background (e.g., data points with a z-coordinate position greater than the particular value). Similarly, controller 103 may configure (at 402) a first density for data points within the center of the point cloud, and a different second density for data points at the periphery or edges of the point cloud.

Process 400 may include activating (at 404) imaging device 101 from a first position with a first set of imaging settings. Controller 103 may issue one or more commands or messages that activate imaging device 101 and that cause imaging device 101 to generate a point cloud representation of an object, scene, or environment in imaging device's 101 field-of-view. For instance, activating (at 404) imaging device 101 may include projecting a structured light pattern from imaging device 101 onto the scene, determining positions or depths of different surfaces based on the distortion to the structured light pattern at different regions of the scene, generating data points in 3D space to coincide with the determined positions of the different surfaces, and populating the non-positional elements of the data points based on color information and/or other characteristics detected for the different surfaces at the corresponding positions.

Process 400 may include obtaining (at 406) the point cloud data that is generated by imaging device 101 from the first position and the first imaging settings. The point cloud data may represent the imaged object, scene, or environment as a set of data points positioned in a 3D space of the point cloud. The positioning of the data points in the 3D space of the point cloud may coincide or match with the positions of different points on surfaces of the imaged object, scene, or environment. In some embodiments, the point cloud data may include the data points for a single point cloud, wherein the single point cloud is generated from a single capture, frame, or image of the object, scene, or environment. In some other embodiments, the point cloud data may include the data points from different point clouds, wherein each of the different point clouds may correspond to a different capture, frame, or image of the same object, scene, or environment from a different position or with different imaging device settings. Accordingly, the different point cloud may capture different parts of the same object, scene, or environment, or may capture overlapping parts from different angles, viewpoints, and/or fields-of-view.

Process 400 may include determining (at 408) the density of the point cloud data at different regions in the represented 3D space. In some embodiments, the density may be based on the distance separating neighboring or adjacent data points, wherein the 3D space and/or the coordinates representing the positioning of the data points may be mapped or scaled to a particular distance measure. Specifically, a difference between the positional values of two different values in the 3D space of the point cloud may represent or correspond to a measurement in millimeters. Accordingly, controller 103 may determine (at 408) the density by comparing the positional elements of neighboring data points, and/or by calculating the distance represented by the difference between the positional elements of neighboring data points. In some embodiments, the density may be based on the number of data points within a particular region or volume of the 3D space. For instance, a first volume of a particular size that contains 10 data points may have a first density regardless of the positioning of the 10 data points relative to one another, and a second volume of the same particular size that contains 16 data points may have a second density regardless of the positioning of the 16 data points relative to one another. In some such embodiments, controller 103 may partition the 3D space spanned by the point cloud into equal sized regions or volumes, and may be count the number of data points within each region or volume to determine (at 408) the density for that region or volume.

Process 400 may include comparing (at 410) the determined (at 408) data point densities to the configured (at 402) desired density or desired densities. In particular, controller 103 may determine whether the density of different subsets of data points in the point cloud data or different partitioned regions within the point cloud are less than, equal to, or greater than the desired density configured for that subset of data points or that partitioned region.

Process 400 may include generating (at 412) the interface with a first color for each subset of data points or partitioned region with a density that is greater than the desired density by a specified amount (e.g., a density that is at least 10% greater than the desired density), a second color for each subset of data points or partition region with a density that is within the specified amount of the desired density (e.g., a density that is within 10% of the desired density), and a third color for each subset of data points or partitioned region with a density that is less than the desired density by the specified amount (e.g., a density that is at least 10% less than the desired density). In some embodiments, additional colors may be used to represent other density gradations across the point cloud.

In some embodiments, generating (at 412) the interface may include producing a mapping of the 3D space within which the point cloud data points are distributed, and presenting the correct coloring for the density that is detected in different regions of the 3D space. In some embodiments, generating (at 412) the interface may include rendering the point cloud data points to produce an image, and overlaying the correct coloring for the density that is detected from different subsets of the data points used in rendering different parts of the image. In some embodiments, generating (at 412) the interface may include presenting the captured data points in 3D space, and coloring each subset of data points or presenting the color overlay over each subset of data points based on the determined density for that subset of data points.

Process 400 may include providing (at 414) statistical information with the interface. The statistical information may provide quantities for identifying the density in a given region of the point cloud, statistics for densities at different regions or depths of the point cloud, and how much a given region differs from the desired density. In other words, the statistical information may include numerical values and/or textual information to support, clarify, and/or add to the information that is conveyed by the different colored overlays.

Figure 5:
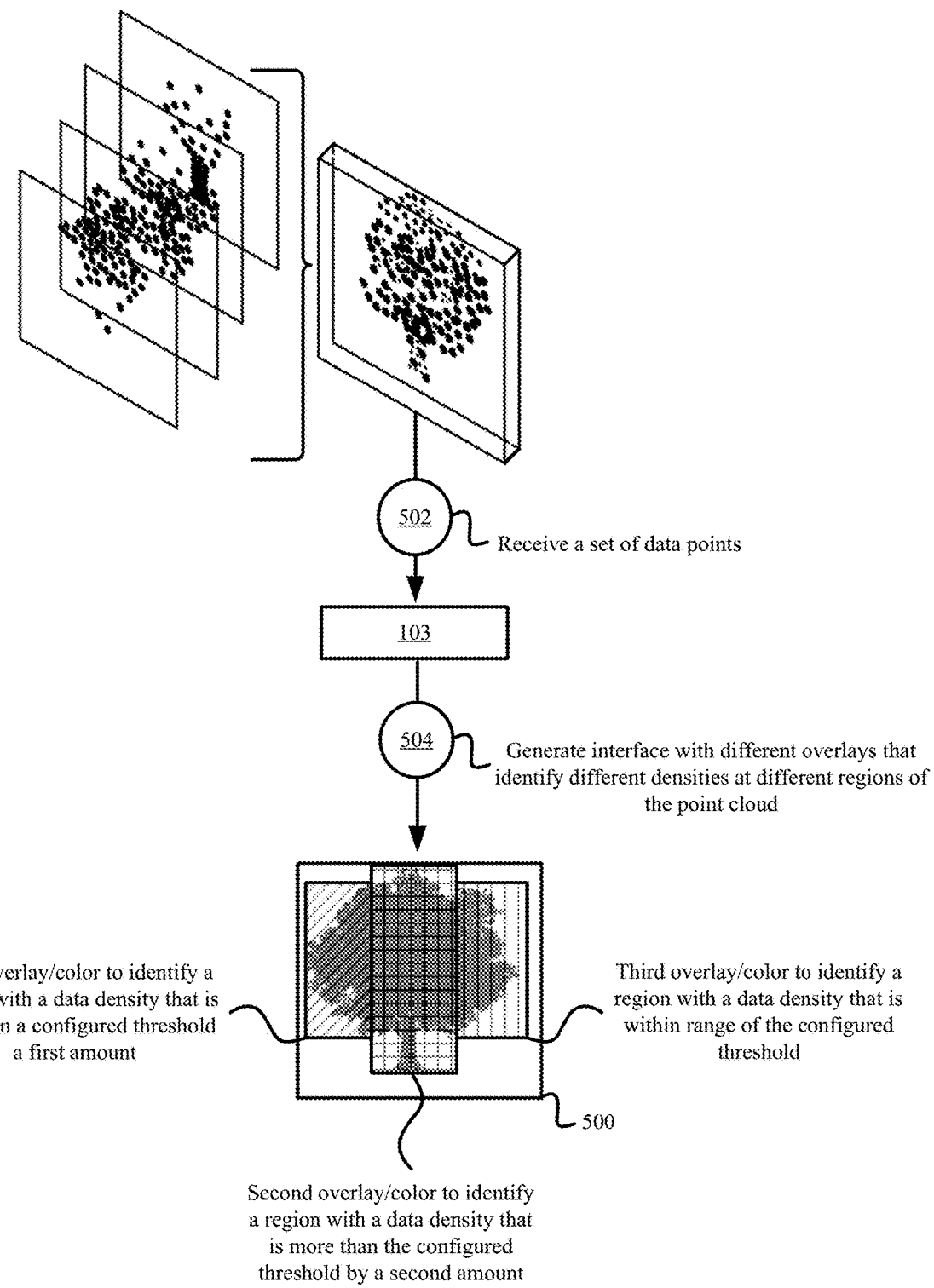
FIG. 5 illustrates an example interface for visually identifying the quality, resolution, or detail with which data points represent an imaged object, scene, or environment in accordance with some embodiments presented herein.

FIG. 5 illustrates an example interface 500 that is generated by controller 103 for visually identifying the quality, resolution, or detail with which data points represent an imaged object, scene, or environment in accordance with some embodiments presented herein. As shown in FIG. 5, controller 103 may receive (at 502) a set of data points that were generated from imaging a particular object, scene, or environment. The data points may be positioned in 3D space based on their respective positional elements.

Controller 103 may generate (at 504) example interface 500 to present different coloring, shading, and/or other visual cues that differentiate between the quality, resolution, or detail of the captured data points at different regions of the point cloud. Controller 103 may select the colorings for each particular region based on the density of the data points within the particular region and/or based on the amount by which the density of the data points within the particular region differs from a desired density that is configured for that particular region.

From the visual cues provided in example interface 500, a user may be notified of regions within the generated point cloud that do not capture the imaged object, scene, or environment with a desired amount of detail. Accordingly, the user may rescan the corresponding parts of the object, scene, or environment to ensure that the resulting point cloud has a desired amount of data, detail, and/or quality. In other words, example interface 500 provides the user with an exact location of the parts that are to be rescanned. Moreover, the user may be provided the notifications while scanning the object, scene, or environment so that the point cloud may be generated at one time with the desired density.

Controller 103 may use various AI/ML techniques to dynamically configure different densities for different regions of a point cloud in order to better represent the amount of detail that is available at those region. For instance, controller 103 may use AI/ML techniques to differentiate between low-resolution regions that are accurately represented by fewer data points from high-resolution regions that are inaccurately captured and lack data points for the detail found within those high-resolution regions. In other words, the AI/ML techniques may differentiate between regions that are correctly represented with a particular density of data points from regions that are incorrectly represented with the same particular density of data points.

The AI/ML techniques may analyze the positional and/or non-positional elements of the data points in order to dynamically configure the desired density for those data points. For instance, controller 103 may determine the density of a set of data points based on the distance between neighboring pairs of data points or the number or distribution of data points in a particular region of space. Controller 103 may then feed the positional elements of the set of data points into a neural network or another AI/ML technique to determine the maximum resolution at which imaging device 101 is able to image surfaces that are different distances away from imaging device 101. For instance, imaging device 101 may resolve an object that is a first distance away at a first resolution (e.g., capture the object with a maximum number of density of data points), whereas the same object that is a further second distance away may be resolved at a lower second resolution (e.g., lower number or density of data points). This difference in the ability of imaging device 101 being able to generate different numbers of data points or different data point densities for the same object at different distances may be due to fewer lasers emitted from imaging device 101 contacting the surface of the object when it is further away, or because a structured light pattern becomes smaller the further it is projected which leads to imaging device 101 being able to resolve less detail and generate fewer data points the more distant an object or surface is from imaging device 101. Accordingly, controller 103 may define different desired densities at which data points or objects at different distances may be captured based on the AI/ML output identifying the maximum resolution or data point density that imaging device 101 is able to resolve for objects or surfaces at different distances.

In some embodiments, the AI/ML techniques may analyze the positional and non-positional elements of data points in a particular region to determine if the data points represent a single object or multiple objects. Controller 103 may configure a same desired density for data points of a single object, and may configure different desired densities for data points of two overlapping objects. For instance, controller 103 may configure a first desired density for a first object that is in the foreground or that is frontmost, and a lower second desired density for a second object that is partially obscured by the first object and that is behind the first object. Alternatively, the AI/ML techniques may determine that a particular object has a curved, angular, or other non-flat shape that prevents imaging device 101 from capturing all surfaces of that particular object with the same density of data points. In such cases, controller 103 may configure different desired densities for data points representing surfaces of the particular object that are not directly exposed to imaging device 101.

Figure 6:
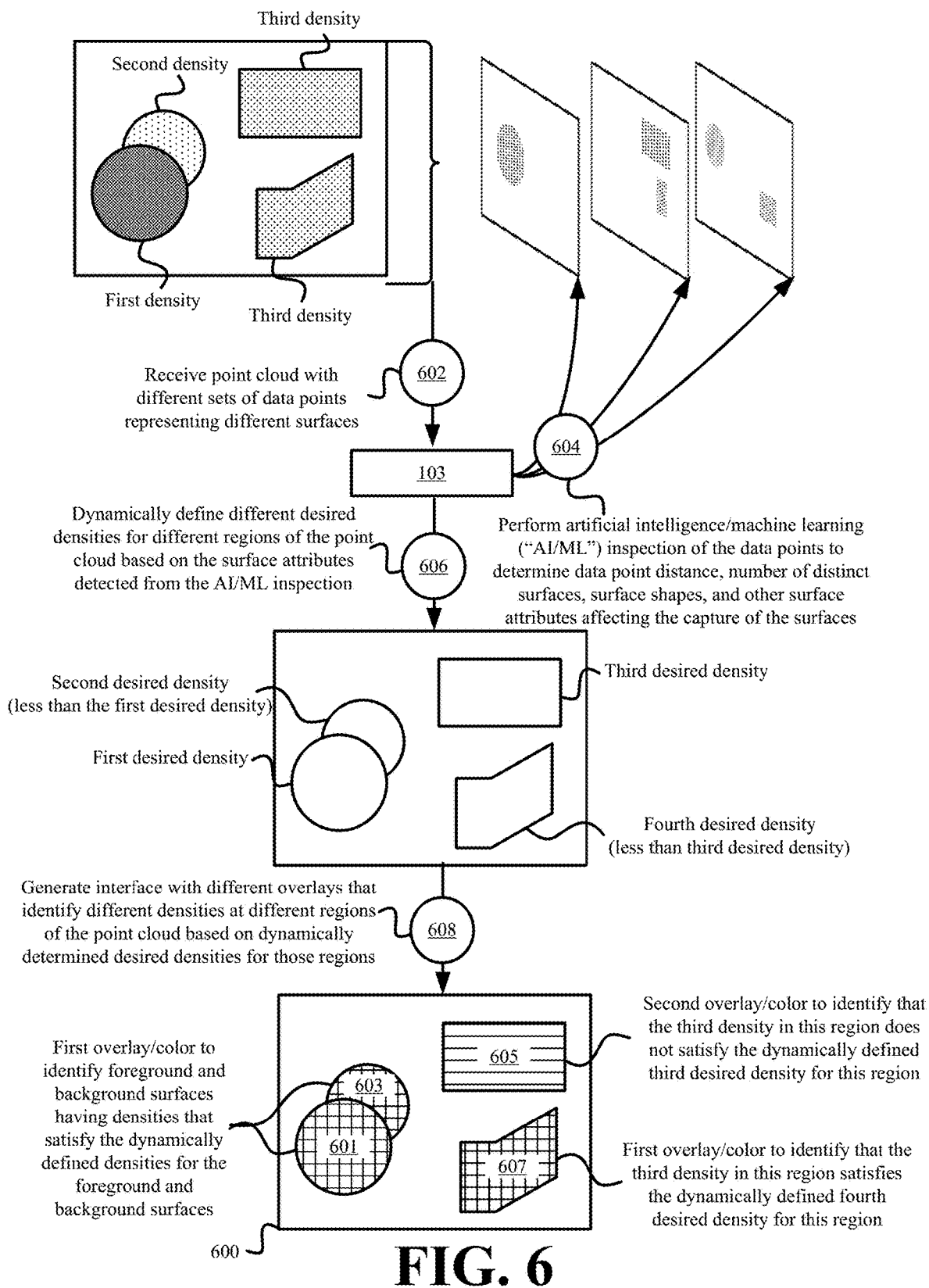
FIG. 6 illustrates an example interface that is generated based on detected data point densities across a point cloud and artificial intelligence/machine learning ("AI/ML") configured densities for different regions of the point cloud in accordance with some embodiments presented herein.

FIG. 6 illustrates example interface 600 that is generated based on detected data point densities across a point cloud and AI/ML configured densities for different regions of the point cloud in accordance with some embodiments presented herein. As shown in FIG. 6, controller 103 may receive (at 602) a point cloud with different sets of data points that are distributed in a 3D space and that represent different surfaces of a scanned object, scene, or environment.

Controller 103 may determine the density of each set of data points. However, rather than compare the densities to a single statically defined desired density, controller 103 may perform (at 604) an AI/ML inspection of the data point positional and/or non-positional elements in order to determine the distance of each surface, the number of surfaces, the shape of the surfaces, and/or other attributes of the surfaces that may affect the amount of detail that may be captured by imaging device 101. Controller 103 may dynamically define (at 606) different desired densities for each set of data points or scanned surface based on the AI/ML inspection.

Controller 103 may generate (at 608) example interface 600 to visually convey the density and/or quality with which each set of data points is captured relative to a dynamically defined density for that set of data points. As shown in FIG. 6, example interface 600 may present first set of data points 601 in the foreground having a first density with the same color overlay as second set of data points 603 in the background having a lower second density. Based on the AI/ML analysis of the point cloud data points, controller 103 may determine that imaging device 101 is unable to capture the more distance second set of data points 603 at a greater density than the second density, and/or that second set of data points 603 provide a sufficient resolution or level-of-detail for the represented object in the background. However, a third set of data points in the foreground (not shown) having the second density may be presented with a different color overlay to indicate that the density for the third set of data points is insufficient based on their distance from imaging device 101.

FIG. 6 also illustrates fourth set of data points 605 and fifth set of data points 607 having the same density, but are presented in the interface with different color overlays. In this case, the AI/ML techniques may analyze the relative positioning of the fourth and fifth sets of data points to determine that fourth set of data points 605 represent a flat surface that is fully exposed to imaging device 101, whereas fifth set of data points 607 represent a surface that gradually curves or angles away and out of imaging device's 101 field-of-view. Based on the AI/ML analysis of the different surfaces, controller 103 may configure a larger third desired density for fourth set of data points 605, and a smaller fourth desired density for fifth set of data points 607.

Accordingly, different sets of data points or regions in the point cloud with different densities may be represented with the same visual cue to notify the user that the density in those regions satisfies or does not satisfy a minimum or expected density for those regions. Similarly, different sets of data points or regions in the point cloud with the same density may be represented with different visual cues to notify the user that the density in one or more regions satisfies or does not satisfy a minimum or expected density for those densities.

Controller 103 may use the AI/ML techniques to enhance the generated interfaces. Specifically, the AI/ML techniques may analyze the positional and/or non-positional elements of data points in high density and low density regions of a point cloud in order to determine a solution for improving the capture in the low density regions. Improving the capture in the low density regions may include performing one or more additional scans of the corresponding surfaces represented in the low density regions from a different imaging device position, imaging device setting, and/or other adjustments to the imaging of the surfaces (e.g., longer exposure time). The provided solution may identify the specific position, imaging device setting, and/or other adjustments that the user is to perform in order to obtain a high density scan of the low density regions.

Figure 7:
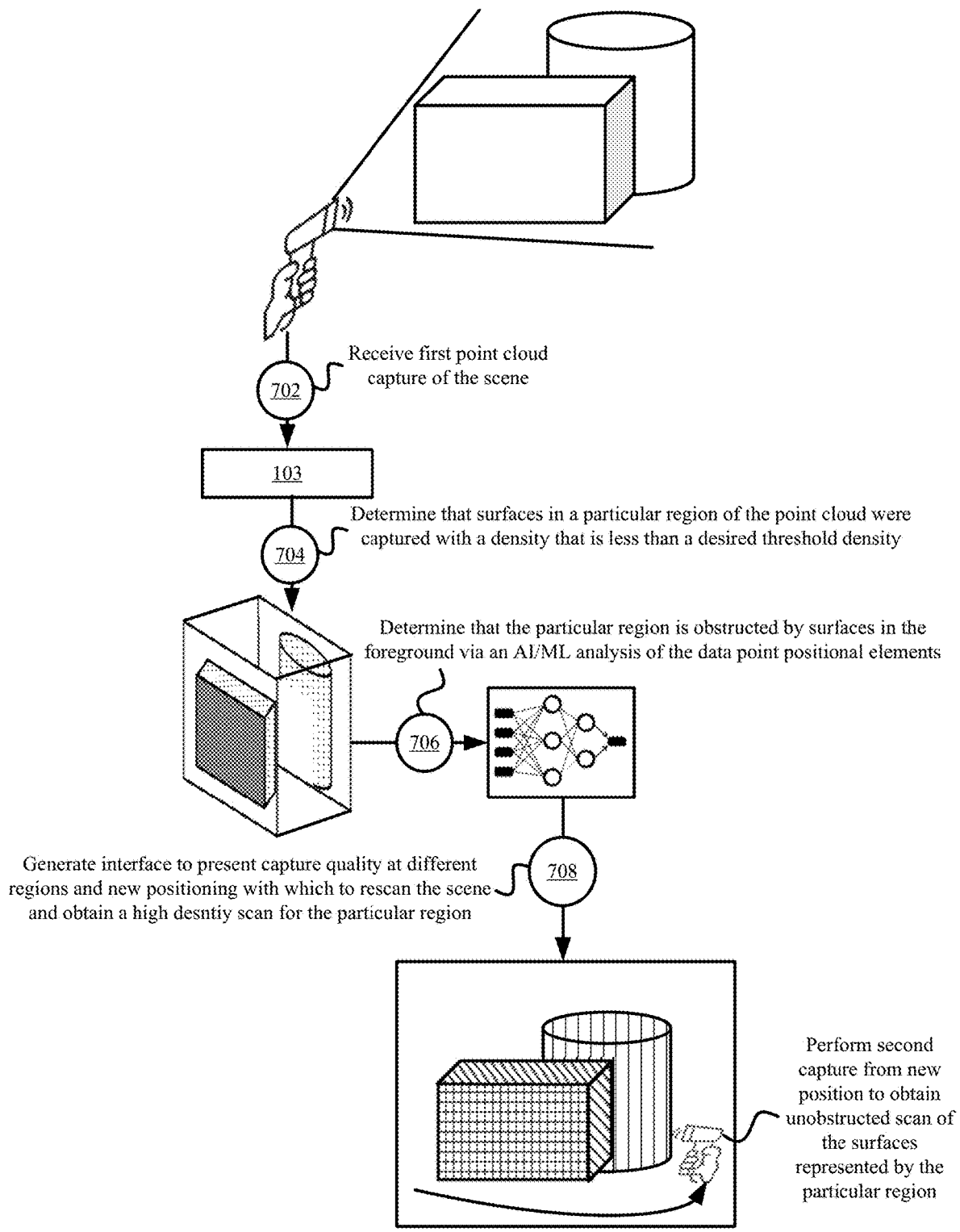
FIG. 7 illustrates an example for improving a point cloud capture based on AI/ML guided solutions in accordance with some embodiments presented herein.

FIG. 7 illustrates an example for improving a point cloud capture based on AI/ML guided solutions in accordance with some embodiments presented herein. As shown in FIG. 7, controller 103 may receive (at 702) a first point cloud capture of an object, scene, or environment. Controller 103 may analyze the density of the first point cloud capture to determine (at 704) that surfaces in a particular region of the point cloud were captured with a density that is less than a desired threshold density.

Controller 103 may input the first point cloud capture into a neural network or one or more AI/ML techniques. The AI/ML techniques may determine (at 706) that the surfaces in the particular region are in the background, and may have been obstructed by surfaces in the foreground. The obstruction may have caused the low density capture of the background surfaces. Accordingly, the AI/ML techniques may determine (at 706) a new position from which the imaging device may capture the background surfaces without obstruction, thereby leading to a high density or improved capture of the background surfaces. By analyzing the positioning of the data points, the AI/ML techniques may identify precise movements of imaging device 101 for an optimal and unobstructed view of the background surfaces and/or the particular region at the low density.

Controller 103 may generate (at 708) an interface to present the detected densities at different regions of the point cloud, the particular region with the deficient or low density, and/or specific movements for repositioning the imaging device and for performing a supplemental unstructured capture of the particular region. Additional scans of the object, scene, or environment from the new position determined by the AI/ML techniques may be combined with the first point cloud capture to supplement the point cloud data for the particular region. For instance, controller 103 or postprocessing device 301 may determine the data points in a second point cloud capture that fall in the same particular region as the low density data points of the first point cloud capture, and may add the data points from the second point cloud capture to the first point cloud capture to increase the data points used in representing the background surfaces represented by the particular region.

In some embodiments, the AI/ML techniques may determine adjustments to imaging settings of imaging device 101 that may improve the capture of a particular low density region. For instance, the AI/ML techniques may analyze the positional elements of the data points in the particular low density region, and may determine that the data points are a threshold distance away from imaging device 101 and are not obstructed from the imaging device field-of-view. Accordingly, the AI/ML may determine that the capture of the particular low density region may be improved by adjusting the zoom of the imaging device lens, adjusting the structured light pattern, adjusting a laser pattern or laser associated with laser triangulation, adjusting intensity of visible or non-visible light, and/or performing other adjustments to settings or properties of imaging device 101 so that the detail of the surfaces represented in the particular low density region may be captured with additional data points. For instance, the solution may involve changing the sine wave of the structured light pattern to increase the frequency and/or to obtain a higher dot pitch, rotating the structured light pattern so that the pattern is overlaid differently on the surfaces, and/or changing the pattern to a finer or coarser pattern.

In some embodiments, controller 103 may control the repositioning and/or adjustment of imaging device 101 in order to automatically recapture low density regions of a point cloud from the different positions and/or with the different imaging device settings without human intervention. In some such embodiments, controller 103 may implement the AI/ML solutions by controlling the actuators of robotic element 201 to move, rotate, tilt, and/or otherwise adjust the position of imaging device 101 mounted to robotic element 201. Specifically, controller 103 may receive the imaging device positions that the AI/ML techniques have identified for unobstructed, closer, and/or other improved capture of low density regions, and may reposition imaging device 101 to the AI/ML identified positions without human intervention. Additionally, controller 103 may provide commands that reconfigure or adjust settings of imaging device 101 without human intervention. For instance, controller 103 may adjust the zoom distance, projected structured light pattern, exposure time, and/or other settings with which imaging device 101 generates a point cloud representation of an object, scene, or environment.

Figure 8:
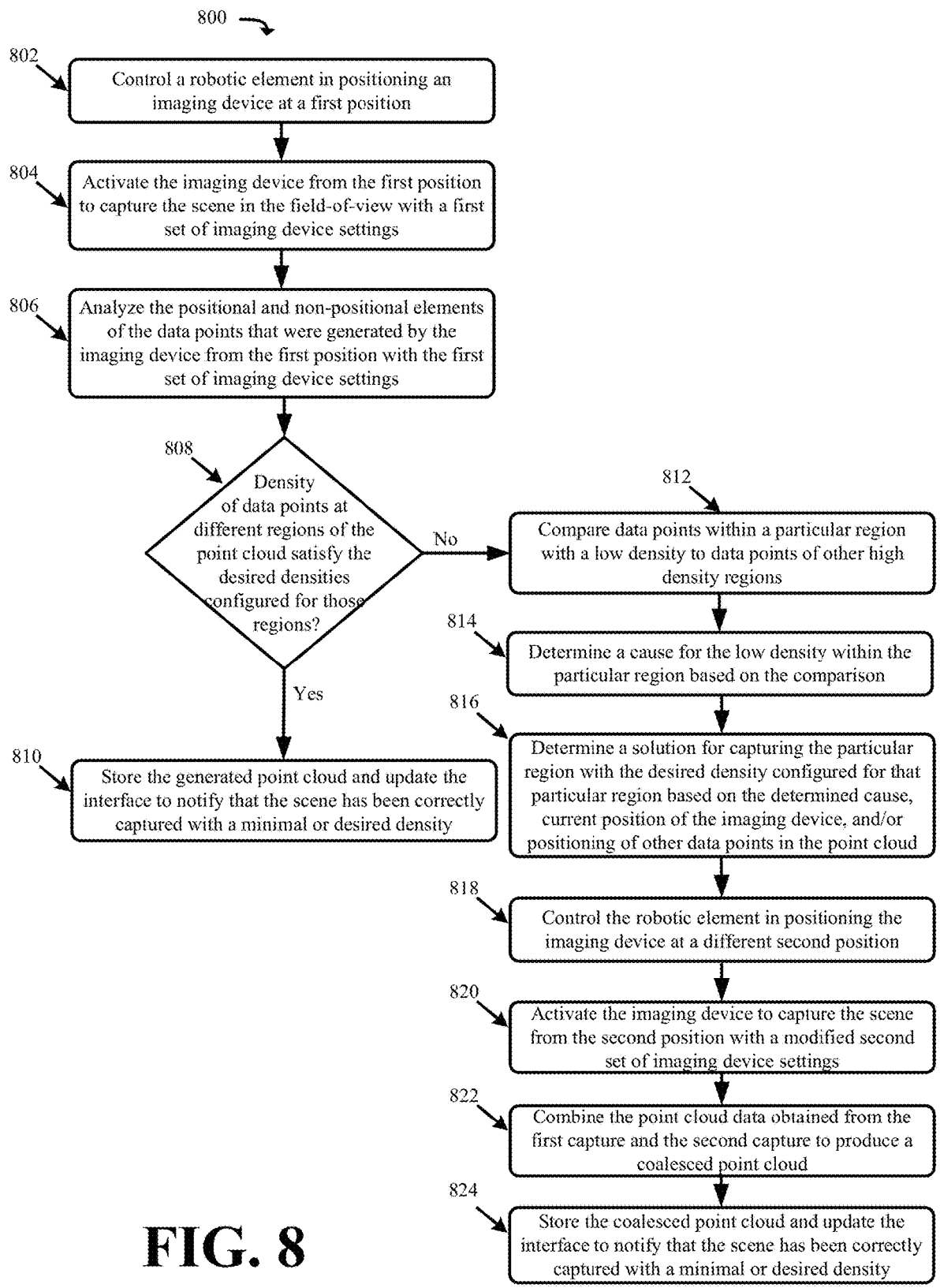
FIG. 8 presents a process for automatically detecting and correcting a point cloud capture in accordance with some embodiments presented herein.

FIG. 8 presents a process 800 for automatically detecting and correcting a point cloud capture in accordance with some embodiments presented herein. Process 800 may be implemented by connecting controller 103 to robotic element 201 and imaging device 101.

Process 800 may include controlling (at 802) robotic element 201 in positioning imaging device 101 at a first position. Controller 103 may provide a set of commands to robotic element 201, and robotic element 201 may move imaging device 101 to a first position in space as a result of executing the set of commands or performing actuator activations according to the set of commands.

Process 800 may include activating (at 804) imaging device 101 from the first position to capture the scene in the field-of-view of imaging device 101 with a first set of imaging device settings. Controller 103 may communicate directly with imaging device 101 to set the zoom distance, structured light pattern to project, exposure time, and/or other imaging settings that may affect the point cloud capture of the surfaces that are in the field-of-view.

Process 800 may include analyzing (at 806) the positional and non-positional elements of the data points that were generated by imaging device 101 from the first position with the first set of settings. Analyzing (at 806) the data points may include determining the density of the captured data points at different regions of the point cloud, and comparing the data point densities to desired densities that are configured for the regions of the point cloud. Process 800 may include determining (at 808) whether the data point densities satisfy the desired densities that are configured for the regions of the point cloud.

In response to the captured data point densities satisfying (at 808—Yes) the desired densities for the point cloud, process 800 may include storing (at 810) the generated point cloud and/or updating the interface to notify a user that the scene has been correctly captured with a minimal or desired density. The user may then access, process, render, and/or otherwise interact with the point cloud having a verified density of data points throughout. Alternatively, controller 103 may control robotic element 201 to move imaging device 101 to a second position from which to capture a different object, scene, or environment.

In response to the captured data point density in a particular region not satisfying (at 808—No) the desired density configured for that particular region, process 800 may include comparing (at 812) the data points within the low density particular region relative to other high density regions of the point cloud, and determining (at 814) a cause for the low density capture in the particular region based on the comparison. In some embodiments, the comparison (at 812) may be performed using one or more AI/ML techniques. Specifically, the point cloud data may be provided as input to the AI/ML techniques, and the AI/ML techniques may analyze the positional and non-positional elements of the data points for commonality in positioning that may be used to differentiate foreground data points that may be obstructing the capture of background data points, and/or for commonality in non-positional values that may identify a continuous surface or different surfaces that intersect or overlap.

Process 800 may include determining (at 816) a solution for capturing the particular region at a high density or with at least the desired density configured for that particular region based on the determined cause, current position of imaging device 101, and/or positioning of other data points in the point cloud. The solution may include identifying a new position from which imaging device 101 may scan the particular region of the scene without obstruction, lengthening the exposure time with which imaging device 101 captures the particular region (e.g., performing multiple captures of the scene from the first position and with the first set of imaging device settings), and/or adjusting settings of imaging device 101 used to capture the particular region. For instance, increasing the zoom onto the particular region may not improve the capture of the particular region when the surfaces in that region are determined to be in the background and obstructed by foreground surfaces. In this instance, the AI/ML techniques may analyze the point cloud to determine a new position from which imaging device 101 may have an unobstructed view of the particular region. Similarly, changing a tilt or position of imaging device 101 may not improve the capture of the particular region when the surfaces in that region are a threshold distance from imaging device 101. In this instance, the AI/ML techniques may determine the amount of zoom that is necessary for accurately capturing the far away region, or changes to the projected structured light pattern that allow for improved detail differentiation at the particular region.

Process 800 may include controlling (at 818) the robotic element in positioning the imaging device at a different second position. Controller 103, via the AI/ML output, may determine that the second position provides a clearer or less obstructed view of the particular view.

Process 800 may include activating (at 820) imaging device 101 to capture the scene from the second position with a modified second set of settings. The modified second set of settings may cause imaging device 101 to resolve additional detail from the particular region than was possible with the first set of settings.

Process 800 may include combining (at 822) the point cloud data obtained from the first capture and the second capture to produce a coalesced point cloud. Combining (at 822) the point cloud data may include aligning the 3D space of the first capture with the 3D space of the second capture. The alignment may include adjusting the data point positioning based on the different positioning of imaging device 101 when the first and second captures were generated (e.g., the differences in the first position and the second position), and/or compensating for any positional offsets that may been introduced by changing the imaging settings used to generate each capture. Combining (at 822) the point cloud data may further include generating a coalesced point cloud that supplements the data points of the first capture with data points from the second capture so that the data points of the coalesced point cloud satisfy the desired densities configured for all regions of the point cloud.

Process 800 may include storing (at 824) the coalesced point cloud and/or updating the interface to notify a user that the scene has been correctly captured with a minimal or desired density. The user may then access the coalesced point cloud to obtain a point cloud representation of the scene that satisfies a minimum level-of-detail or quality throughout the point cloud without the user having to manually inspect each generated point cloud and/or without the user having to determine how to correct low density regions of the point cloud.

Figure 9:
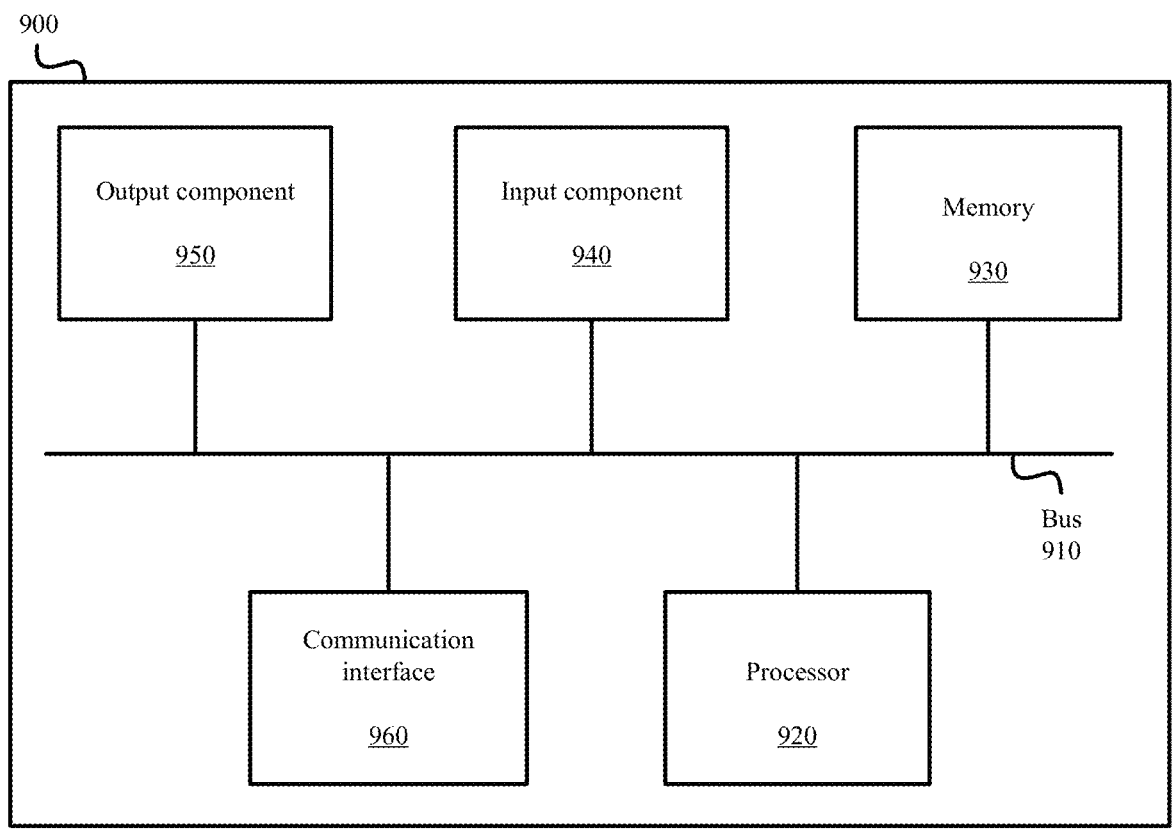
FIG. 9 illustrates example components of one or more devices, according to one or more embodiments described herein.

FIG. 9 is a diagram of example components of device 900. Device 900 may be used to implement one or more of the devices or systems described above (e.g., imaging device 101, controller 103, robotic element 201, postprocessing device 301, and/or other elements of system architecture 300). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
generating a first set of data in response to scanning a scene with an imaging device at a first position, wherein the first position exposes a first region of the scene to the imaging device from a first perspective;
determining that a density associated with the first set of data does not satisfy a density threshold;
identifying a second position that exposes the first region of the scene to the imaging device from a different second perspective;
generating a second set of data in response to scanning the scene with the imaging device at the second position;
determining that a combination of the first set of data and the second set of data satisfies the density threshold; and
generating an image of the first region from coalescing the first set of data and the second set of data.

2. The method of claim 1, wherein determining that the density does not satisfy the density threshold comprises:
determining that the first perspective obscures a particular part of the first region from the imaging device; and
determining that the second perspective exposes the particular part of the first region to the imaging device.

3. The method of claim 1,
wherein generating the first set of data comprises capturing the scene with the imaging device configured with a first set of settings; and
wherein generating the second set of data comprises capturing the scene with the imaging device configured with a different second set of settings.

4. The method of claim 1 further comprising:
controlling one or more actuators in repositioning the imaging device to the second position.

5. The method of claim 4, wherein controlling the one or more actuators in repositioning the imaging device to the second position comprises one or more of moving the imaging device closer to the scene, rotating the imaging device, or elevating the imaging device.

6. The method of claim 4 further comprising:
controlling the one or more actuators in repositioning the imaging device to a third position that exposes a second region of the scene to the imaging device in response to determining that the combination of the first set of data and the second set of data satisfies the density threshold.

7. The method of claim 1,
wherein the first set of data comprises data points detected at a first set of positions;
wherein the second set of data comprises data points detected at a second set of positions; and
wherein generating the image comprises constructing the first region of the scene from the data points detected at the first set of positions and the data points detected at the second set of positions.

8. The method of claim 1 further comprising:
generating a third set of data in response to scanning a second region of the scene with the imaging device at the first position;
determining that the third set of data satisfies the density threshold; and
generating an image of the second region from the third set of data.

9. The method of claim 1 further comprising:
generating a third set of data in response to scanning a second region of the scene with the imaging device at the first position;
determining that the second region is at a different depth or distance from the imaging device than the first region; and
analyzing a density of the third set of data with a different density threshold than the density of the first set of data based on the different depth or distance of the second region from the imaging device than the first region.

10. The method of claim 1 further comprising:
generating a third set of data in response to scanning a second region of the scene with the imaging device at the first position;
determining that the second region is at a periphery of the scene and that the first region is at a center of the scene; and
analyzing a density of the third set of data with a different density threshold than the density of the first set of data based on the second region being at the periphery of the scene and the first region being at the center of the scene.

11. The method of claim 1 further comprising:
computing the density associated with the first set of data based on distances between different data points in the first set of data.

12. The method of claim 1 further comprising:
computing the density associated with the first set of data based on spatial separation between different data points of the first set of data in a three-dimensional space.

13. The method of claim 1 further comprising:
computing the density associated with the first set of data based on a number of data points in the first set of data and a size of the first region represented by the first set of data.

14. The method of claim 1 further comprising:
generating a first representation of the first region based on the first set of data not satisfying the density threshold; and
generating a second representation of the first region based on the combination of the first set of data and the second set of data satisfying the density threshold.

15. The method of claim 14,
wherein generating the first representation comprises presenting the first region with a first color; and
wherein generating the second representation comprises presenting the first region with a second color.

16. A system comprising:
an imaging device; and
one or more processors configured to:
generate a first set of data in response to scanning a scene with the imaging device at a first position, wherein the first position exposes a first region of the scene to the imaging device from a first perspective;
determine that a density associated with the first set of data does not satisfy a density threshold;
identify a second position that exposes the first region of the scene to the imaging device from a different second perspective;
generate a second set of data in response to scanning the scene with the imaging device at the second position;
determine that a combination of the first set of data and the second set of data satisfies the density threshold; and
generate an image of the first region from coalescing the first set of data and the second set of data.

17. The system of claim 16 further comprising:
one or more actuators that reposition the imaging device to the second position in response to signaling from the one or more processors.

18. A non-transitory computer-readable medium storing program instructions that, when executed by one or more processors of an image capture system, cause the image capture system to perform operations comprising:
generate a first set of data in response to scanning a scene with an imaging device at a first position, wherein the first position exposes a first region of the scene to the imaging device from a first perspective;
determine that a density associated with the first set of data does not satisfy a density threshold;
identify a second position that exposes the first region of the scene to the imaging device from a different second perspective;
generate a second set of data in response to scanning the scene with the imaging device at the second position;
determine that a combination of the first set of data and the second set of data satisfies the density threshold; and
generate an image of the first region from coalescing the first set of data and the second set of data.

* * * * *